June 23, 1931. J. C. M. MASSEY 1,811,018
TRACTION OF VEHICLES
Filed Oct. 11, 1929
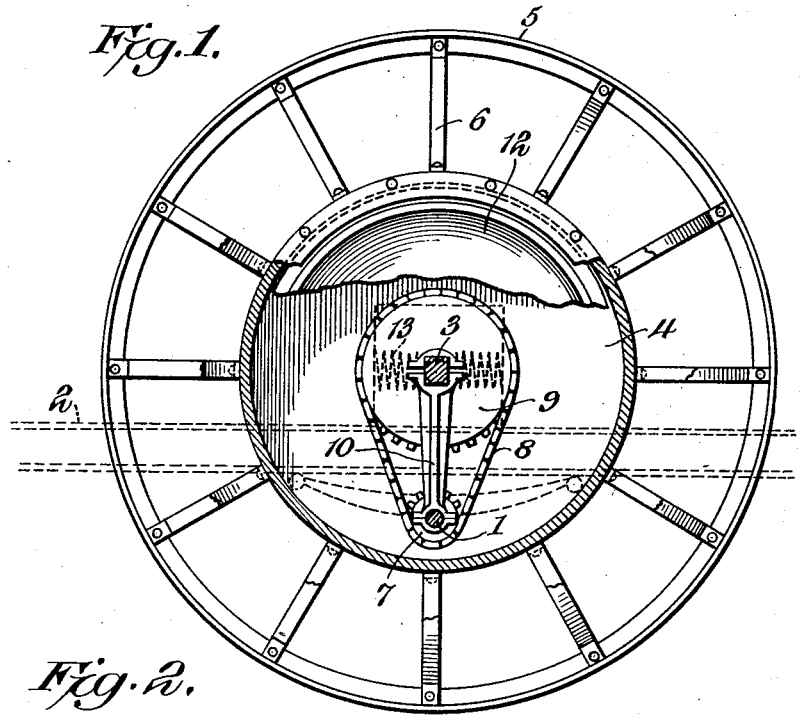
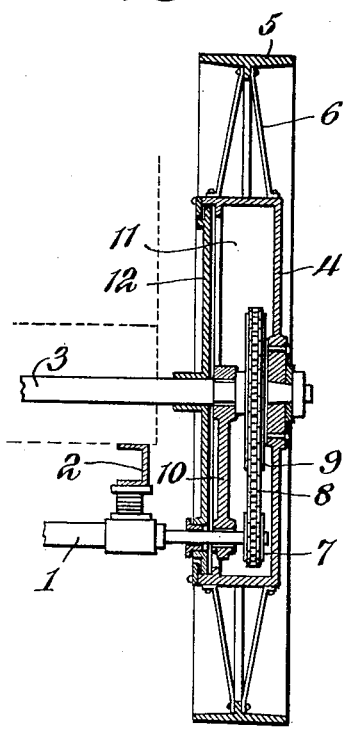
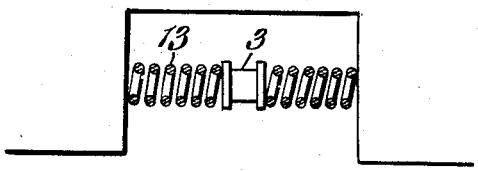
Inventor,
Juan C. M. Massey,
By
Attorney Patented June 23, 1931

1,811,013

UNITED STATES PATENT OFFICE

JUAN CARLOS MOLINA MASSEY, OF ADROGUE, ARGENTINA

TRACTION OF VEHICLES

Application filed October 11, 1929, Serial No. 398,971, and in Argentina September 9, 1929.

This invention relates to a new system for the traction of vehicles of any kind, and has essentially for its object a system of traction by means of which it is possible to increase the force through the medium of the vehicle's own weight.

By means of the traction system of this invention other advantages are obtainable which will be disclosed in the present description and will be made conspicuous in the claims hereunto appended.

In order that this invention may be clearly understood and readily put into practice, an example of the working arrangement is given in the accompanying drawings:—

Figure 1 is a side elevation, partially in section, of a driving wheel in accordance with the present invention.

Figure 2 is a vertical transverse section of the same, and:

Figure 3 is an enlarged fragmentary horizontal detail sectional view.

In all the figures mentioned, the same reference numbers indicate corresponding parts.

In accordance with the present invention the driving axle 1 of the vehicle which is supported by its frame 2 either fixedly or through the medium of springs, transmits the movement to a floating axle 3 to each end of which is firmly fitted the driving or pulling wheel 4, which in the present case is joined by spokes 6 to the tires 5. The tires may be of any kind, either for road running or for running on rails and, if so desired, rubber tires or any other kind can be fitted.

As will be seen, the axle 3 of the driving wheel is capable of forward and back movement in regard to the solid driving axle of the vehicle, and, consequently, the relative positions of these two axles can be varied vertically.

The axles 1 and 3 are connected by means of a rod 10, so that the distance between them is always maintained, the said connecting rod serving to transmit the weight of the vehicle from the axle 1 to the axle 3 and, consequently, to the road.

The transmission of motion between axle 1 and axle 3 is effected by means of a cog-wheel 7 on the axle 1, which transmits the movement of the said axle 1 through the medium of a chain or similar arrangement 8 to a cog-wheel 9 on the floating axle 3.

The relation of distance between the cog-wheels 7 and 9 can be varied according to the desire of increasing the force or velocity, which is obvious to those well versed in matters of this kind.

It will be seen that both the cogs and connecting rod are encased in a box 11 formed by the part 4 of the wheel and a cover 12, which enables them to be kept in a coat of oil or grease. If it is desired, this cover 12 may be joined to the connecting rod 10.

On the revolution of the axle 1, by reason of the resistance of the wheel 5, the connecting rod 10 tends to assume a slanting position, the weight of the vehicle assisting in carrying the said connecting rod to a vertical position, through which the draught of the chain on the haulage side is increased. When the said force or resistance is increased as a result of any obstacle that may be encountered on the road, the wheel 5 increases the tendency of the said connecting rod to take up a slanting position in consequence of which the action of the weight of the vehicle is greater.

In order to obviate the jolts which, as a consequence of these movements, may be produced by the axle 3, intermediate springs are fitted on opposite sides of the latter for the purpose of counteracting the said jolts, the springs to be of the type 13 shown in drawings made of metal, although rubber buffers may be substituted and which are fitted in any convenient way to the body of the vehicle.

In accordance with this invention the system can be applied to all classes of vehicles, especially automobiles, trucks, tractors, agricultural machinery, electric locomotives or any other kind and, in general, to all classes of vehicles that are motor driven.

It is evident that various constructional modifications and details can be resorted to without departing from the spirit of this invention which is clearly defined in the claims following the present description.

Having now fully described the present invention and the manner in which it should be put into effect, I hereby declare that what I claim to be my own invention is:—

1. The combination of a traction wheel; a floating shaft carrying the same; a driving shaft; resilient means active on the floating shaft to tension the same when displaced; means uniformly spacing the shafts from each other; and means for transmitting motion from one shaft to the other.

2. The combination with a vehicle frame, of a power shaft connected thereto; a floating shaft superposed relative to the latter; opposed tensioning members supported in the frame and active against the floating shaft at opposite sides; driven connections between the shafts; and enclosure for the driven connections; and means spacing the shafts uniformly from each other.

In testimony whereof I affix my signature.

JUAN CARLOS MOLINA MASSEY.